United States Patent
Summer et al.

(10) Patent No.: US 10,065,690 B2
(45) Date of Patent: Sep. 4, 2018

(54) CONFORMAL SUSPENSION FOR UNMANNED GROUND VEHICLE

(71) Applicant: HARRIS CORPORATION, Melbourne, FL (US)

(72) Inventors: Matthew D. Summer, Melbourne, FL (US); Paul M. Bosscher, West Melbourne, FL (US); Nicholas Murphy-DuBay, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 446 days.

(21) Appl. No.: 14/678,237

(22) Filed: Apr. 3, 2015

(65) Prior Publication Data

US 2016/0297065 A1     Oct. 13, 2016

(51) Int. Cl.
*B25J 5/00* (2006.01)
*B60G 5/00* (2006.01)
(Continued)

(52) U.S. Cl.
CPC ......... *B62D 55/108* (2013.01); *B25J 5/005* (2013.01); *B60G 5/00* (2013.01); *B60G 5/01* (2013.01);
(Continued)

(58) Field of Classification Search
CPC ... B25J 5/005; B60G 5/00; B60G 5/01; B60G 5/04; B62D 55/06; B62D 55/075;
(Continued)

(56) References Cited

U.S. PATENT DOCUMENTS

| 1,138,181 | A | * | 5/1915 | Bock | B60G 11/14 |
| | | | | | 267/252 |
| 1,480,693 | A | * | 1/1924 | Rackham | B62D 55/108 |
| | | | | | 305/141 |

(Continued)

OTHER PUBLICATIONS

Moubarak, Paul M., et al., "On the Dual-Rod Slider Rocker Mechanism and Its Applications to Tristate Rigid Active Docking," Journal of Mechanisms and Robotics; Feb. 2013, vol. 5/011010-1, copyright 2013 by ASME.

(Continued)

*Primary Examiner* — Paul N Dickson
*Assistant Examiner* — Maurice L Williams
(74) *Attorney, Agent, or Firm* — Fox Rothschild LLP; Robert J. Sacco; Carol E. Thorstad-Forsyth

(57) ABSTRACT

A ground vehicle suspension system includes first and second rocker-bogie mechanisms which are respectively secured to a chassis on opposing sides of a central axis. Each rocker-bogie mechanism includes a main link on which a first and second bogie is respectively pivotally mounted. The first and second bogie each has opposing inner and outer bogie end portions. On each bogie, an inner wheel is disposed on an inner stub axle and an outer wheel is disposed on an outer stub axle. A continuous track is guided on the inner and outer wheels of the first bogie and second bogie. A resilient member extends between the first and second bogie and is attached at one end to the inner bogie end portion of the first bogie and at an opposing end to the inner bogie end portion of the second bogie.

17 Claims, 8 Drawing Sheets

(51) Int. Cl.
   *B60G 5/01* (2006.01)
   *B60G 5/04* (2006.01)
   *B62D 55/075* (2006.01)
   *B62D 55/108* (2006.01)
   *B62D 55/14* (2006.01)
   *B62D 55/30* (2006.01)
   *B62D 57/024* (2006.01)

(52) U.S. Cl.
   CPC ............ *B60G 5/04* (2013.01); *B62D 55/075* (2013.01); *B62D 55/14* (2013.01); *B62D 55/305* (2013.01); *B62D 57/024* (2013.01); *B60G 2300/07* (2013.01); *B60G 2300/32* (2013.01); *Y10S 901/01* (2013.01)

(58) Field of Classification Search
   CPC .... B62D 55/10; B62D 55/104; B62D 55/108; B62D 55/14; B62D 57/024; B62D 55/305
   See application file for complete search history.

(56) References Cited

U.S. PATENT DOCUMENTS

| | | | |
|---|---|---|---|
| 1,513,144 A * | 10/1924 | Wellman | B62D 55/08 305/134 |
| 1,579,245 A * | 4/1926 | Pennington | B62D 55/108 305/134 |
| 1,673,875 A * | 6/1928 | Knox | B62D 55/104 305/134 |
| 1,744,229 A * | 1/1930 | Knox | B62D 55/108 305/134 |
| 1,786,430 A * | 12/1930 | Kegresse | B62D 55/104 305/134 |
| 1,824,086 A * | 9/1931 | Knox | B62D 55/108 277/369 |
| 1,952,078 A * | 3/1934 | Knox | B62D 55/108 280/680 |
| 2,333,107 A * | 11/1943 | Knox | B62D 55/108 267/251 |
| 2,336,485 A * | 12/1943 | Knox | B60G 5/04 188/316 |
| 2,367,751 A * | 1/1945 | Bombardier | B62D 55/108 267/251 |
| 2,913,252 A * | 11/1959 | Norrie | B60G 5/04 105/198.1 |
| 3,047,167 A * | 7/1962 | Rose | B25J 5/005 200/18 |
| 3,093,006 A * | 6/1963 | Gamaunt | B62D 55/08 301/52 |
| 3,216,520 A * | 11/1965 | Blonsky | B62D 55/06 180/6.7 |
| 3,387,857 A * | 6/1968 | Roberts | B60G 5/04 267/253 |
| 3,484,139 A * | 12/1969 | Danner | B62D 55/108 267/292 |
| 3,658,145 A * | 4/1972 | Bergmann | B62M 27/02 180/193 |
| 3,752,498 A * | 8/1973 | Shea | B60G 5/04 267/64.16 |
| 3,810,516 A * | 5/1974 | Reimer | B60G 5/01 172/830 |
| 3,826,325 A | 7/1974 | Purcell et al. | |
| 3,841,424 A * | 10/1974 | Purcell | B62D 55/08 180/9.5 |
| 4,000,914 A * | 1/1977 | Wragg | B60G 11/22 267/257 |
| 4,351,572 A * | 9/1982 | Fujiwara | B62D 55/1086 305/132 |
| 4,583,791 A * | 4/1986 | Nagata | B62D 55/08 305/134 |
| 4,708,218 A * | 11/1987 | Makela | B62D 55/08 180/9.1 |
| 5,031,973 A * | 7/1991 | Gillet | B62D 49/08 305/132 |
| 6,904,986 B2 * | 6/2005 | Brazier | B62D 49/0635 180/9.21 |
| 7,552,785 B2 | 6/2009 | Tuhy | |
| 7,597,161 B2 | 10/2009 | Brazier | |
| 7,740,084 B2 * | 6/2010 | Rosenboom | A01B 51/04 172/292 |
| 7,862,131 B2 * | 1/2011 | Poirier | B62D 55/14 180/9.5 |
| 8,702,183 B2 * | 4/2014 | Yoshida | B62D 55/104 305/132 |
| 9,290,216 B2 * | 3/2016 | Fairhead | B62K 3/002 |
| 9,308,951 B2 * | 4/2016 | Pare | B62D 55/14 |
| 2004/0009038 A1 * | 1/2004 | Roth | B62D 55/14 404/83 |
| 2008/0210478 A1 * | 9/2008 | Isley | B60G 5/02 180/9.54 |
| 2010/0307371 A1 * | 12/2010 | Rodet | B61F 5/52 105/133 |
| 2014/0174839 A1 * | 6/2014 | Steben | B62D 55/06 180/9.23 |
| 2015/0048671 A1 * | 2/2015 | Hansen | B62D 55/04 305/165 |
| 2016/0121946 A1 * | 5/2016 | Piens | B62D 55/15 305/15 |
| 2016/0368549 A1 * | 12/2016 | Davis | B62D 55/108 |

OTHER PUBLICATIONS

Dollar, Aaron M., et al., "Joint Coupling Design of Underactuated Grippers," Proceedings of IDETC/CIE 2006, ASME 2006 International Design Engineering Conference, Sep. 1013, 2006, Philadelphia, Pennsylvania, copyright 2006 by DEAS, Harvard University.

Robson, Nina P., "Mechanical Design of a Standardized Group Mobile Platform," International Journal of Modern Engineering, vol. 12, No. 2, Spring/Summer 2012.

* cited by examiner

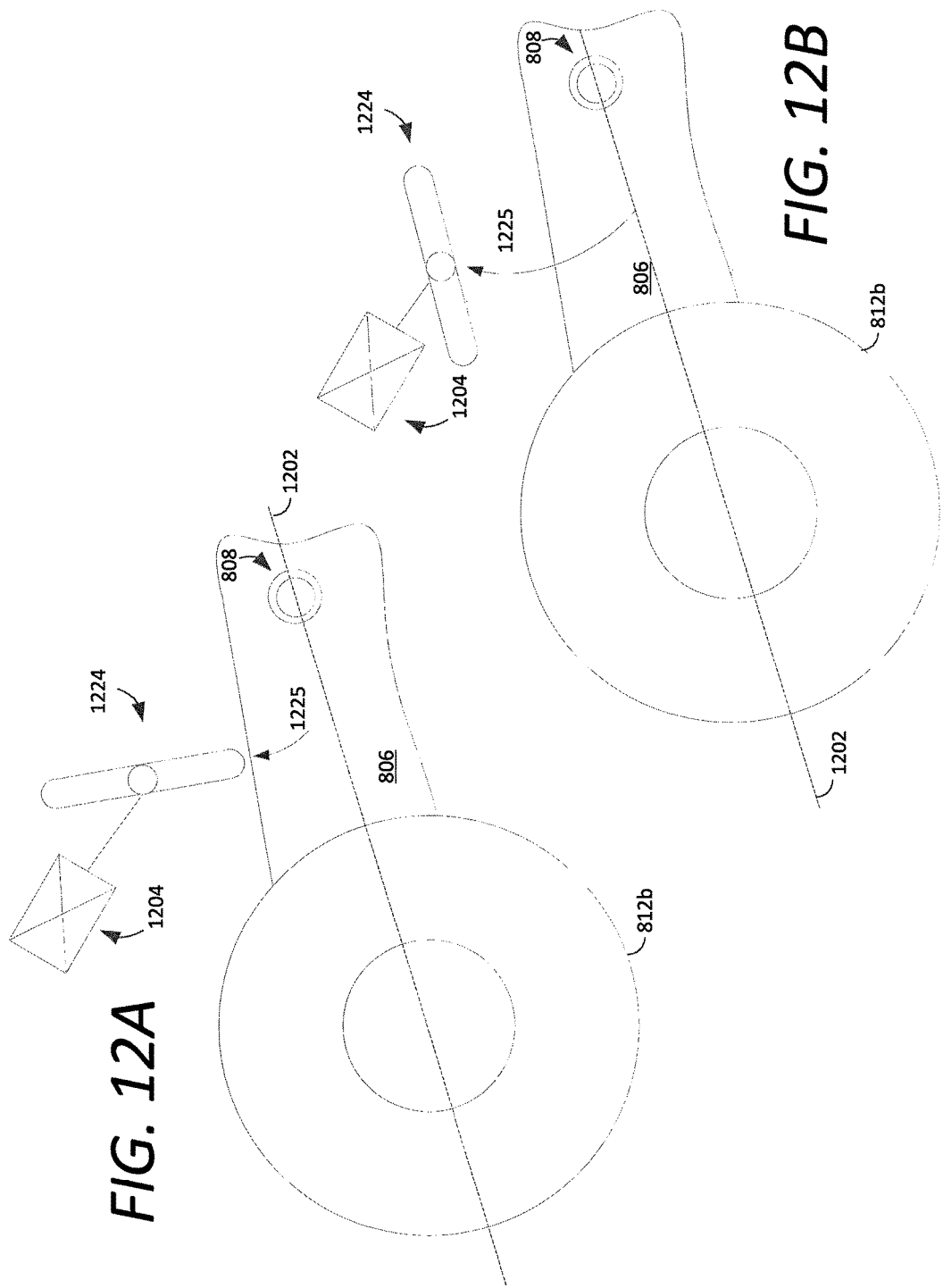

CONFORMAL SUSPENSION FOR UNMANNED GROUND VEHICLE

BACKGROUND OF THE INVENTION

Statement of the Technical Field

The inventive arrangements relate to unmanned ground vehicles, and more particularly to improvements in suspensions systems used in unmanned ground vehicles.

Description of the Related Art

An unmanned ground vehicle ("UGV") requires a suspension system that supports a wide range of capabilities. For example, a UGV suspension system must provide good off-road mobility and must perform well on rocks, dirt, snow, and inclines. Further, a UGV suspension system must exhibit good mobility on man-made structures such as stairs and curbs. A UGV typically also includes a manipulator arm. Accordingly, as a further requirement, a UGV suspension system should provide good stability during manipulation operations where the manipulator arm has large horizontal reach and is used to lift heavy objects.

In an effort to satisfy all of these requirements, various UGV suspension systems have been proposed. The simplest approach can involve fixed tracks and/or wheels (i.e. no suspension). However, such an arrangement offers little in the way of mobility benefit. Another approach involves a plurality of elongated flippers which pivot on one end. Each flipper has a moving track which extends around the flipper. Although effective, multiple tracked flippers are complex, expensive and offer poor manipulation support. Another UGV suspension option is an independent wheel suspension in which each wheel moves independently on a resilient member. However, these systems provide poor manipulation support because they allow the UGV chassis to shift when a manipulator arm places heavy torque loads on the UGV chassis. Rocker-bogie suspension systems are also known in the art. Such systems have excellent passive conformal capabilities for a wide variety of terrain. However, they offer poor manipulation support, especially under conditions where a manipulator arm exerts heavy torque loads on the UGV chassis.

SUMMARY OF THE INVENTION

Embodiments of the invention concern a ground vehicle having a suspension system. The ground vehicle includes a chassis having a central axis which extends along a chassis length. The suspension system includes first and second rocker-bogie mechanisms which are respectively secured to the chassis on opposing sides of the central axis. Each rocker-bogie mechanism includes a main link formed of a rigid material that is fixed to the chassis and extends a first distance along the chassis length to define opposing first and second link end portions. First and second bogies are respectively pivotally mounted to the main link at opposing ends thereof so as to respectively pivot about a first and a second pivot axis. The first and second bogie each have opposing inner and outer bogie end portions. An inner and outer stub-axle is respectively located at each of the inner and outer bogie end portions. An inner wheel is disposed on the inner stub axle and an outer wheel is disposed on the outer stub axle. A continuous track is guided on the inner and outer wheels of both the first bogie and second bogie. A resilient member, such as a spring, extends between the first and second bogie and is attached at one end to the inner bogie end portion of the first bogie and at an opposing end to the inner bogie end portion of the second bogie. An exterior face of the continuous track extends between the outer wheels of the first and second bogies to define a primary terrain engagement surface.

The first and second pivot mechanisms are respectively aligned with a force axis of the resilient member. This alignment facilitates a pivot motion of the first bogie in a first rotation direction from a first bogie rest position and a symmetric pivot motion of the second bogie in a second rotation direction from a second bogie rest position, the second rotation direction opposite but to the first rotation direction. The first and second rotation directions facilitate a concave deformation of the exterior face when a deformation force is exerted upon the exterior face in the direction toward the main link.

BRIEF DESCRIPTION OF THE DRAWINGS

Embodiments will be described with reference to the following drawing figures, in which like numerals represent like items throughout the figures, and in which:

FIGS. 12A and 12B shows an alternative embodiment of the invention which includes an adjustable travel limiter that selectively varies an amount of rotation which is permitted for a bogie.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
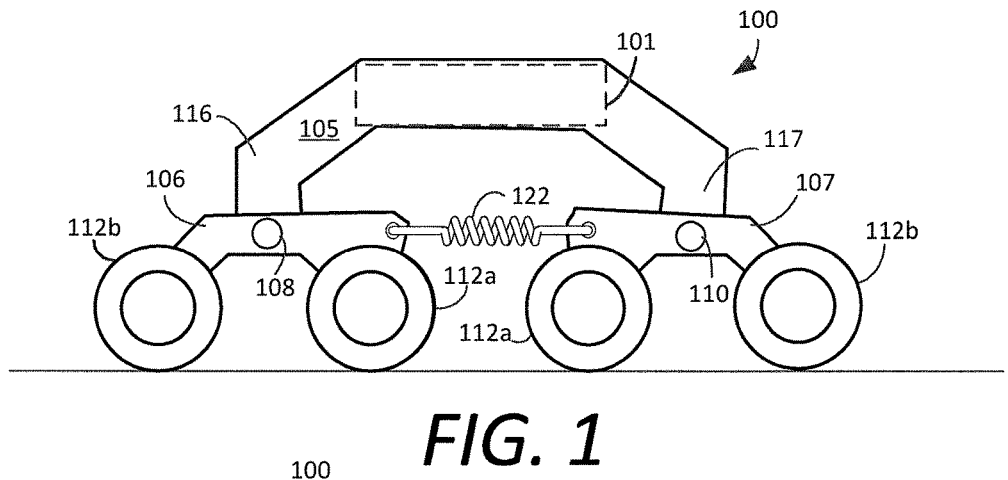
FIG. 1 is a side view showing a ground vehicle with a first embodiment of a rocker-bogie suspension system that is useful for understanding the invention.
Figure 2:
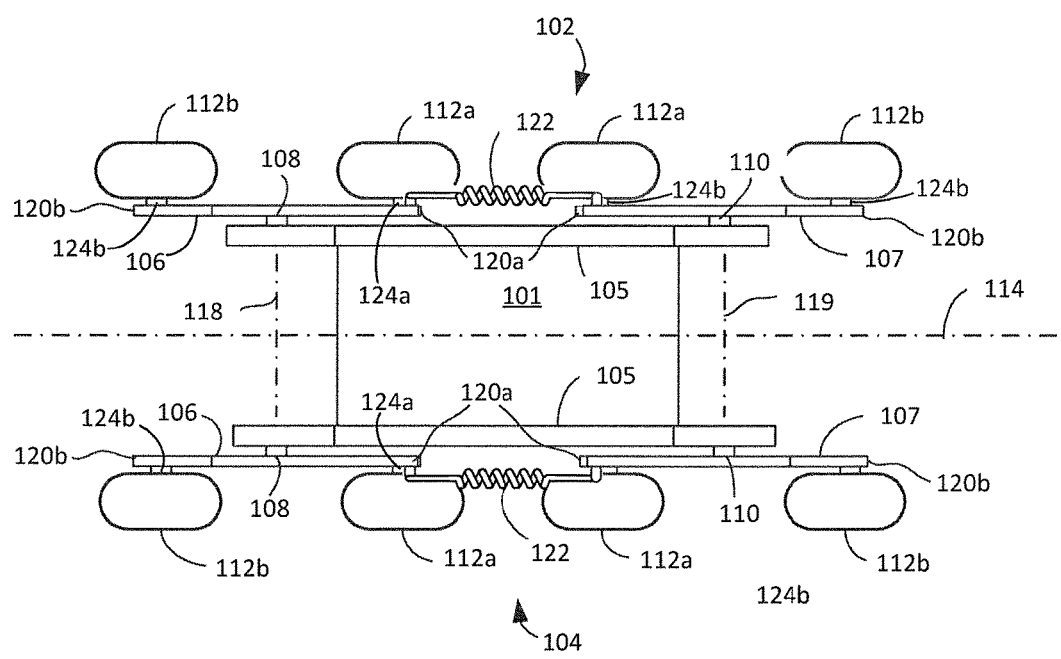
FIG. 2 is a top view of the ground vehicle shown in FIG. 1.

Referring now to FIGS. 1 and 2, there is shown a ground vehicle 100 that is useful for understanding certain aspects of the inventive arrangements. The ground vehicle 100 includes a chassis 101 to which are mounted certain components associated with a suspension system. The suspension system includes first and second rocker-bogie mechanisms 102, 104 which are respectively secured to the chassis 101 on opposing sides of the central axis 114. Each rocker-bogie mechanism includes a main link 105 formed of a rigid material that is fixed to the chassis 101 and extends a first distance along the chassis length to define opposing first and second link end portions 116, 117. A first bogie 106 and a second bogie 107 are respectively mounted to each main link 105 on first and second pivot mechanisms 108, 110 to respectively pivot about a first and a second pivot axis 118, 119. As best shown in FIG. 2, each of the pivot axes 118, 119 are arranged so that they are generally transverse to the central axis 114. The first and second bogie 106, 107 on each side of the ground vehicle extend a distance parallel to the central axis so that each defines opposing inner and outer bogie end portion 120a, 120b. As shown in FIGS. 1 and 2, the inner bogie end portion 120a of the first bogie 106 is adjacent to the inner bogie end portion 120a of the second bogie 107. On each of the first and second bogies an inner and outer stub-axle 124a, 124b is respectively located at the inner and outer bogie end portion. The inner stub-axle rotatably supports an inner wheel 112a. An outer wheel 112b is supported on the outer stub axle.

A resilient member 122 extends between the first and second bogie and is attached at one end to the inner bogie end portion 120a of the first bogie and at an opposing end to the inner bogie end portion 120a of the second bogie. According to one aspect of the invention, the resilient member 122 can be a coil spring made of a spring metal. However, the invention is not limited in this regard and other types of resilient members can also be used for purposes of the inventive arrangements described herein. In order to understand the purpose of the resilient member 122, reference is made to FIG. 3, which shows the ground vehicle 100 traversing a step 301. It can be observed in FIG. 3 that the spring coupling between the first and second bogie 106, 107 encourages symmetry of the bogies 106, 107 by urging the inner bogie end portion 120a of second bogie 107 upwardly in a direction indicated by arrow 302. In this example this occurs because the stretching of element 122 results in a spring force that acts on bogie 107 in a direction that applies a torque to bogie 107 in a clockwise direction about stub axis 110. As a result of this clockwise torque, the contact force between wheel 112a and the step 301 decreases (to the point of losing contact with the ground) while the force 310 exerted on wheel 112b by the step 301 increases. This improves the ground vehicle's stability for climbing by shifting the center-of-pressure of the rear bogie 107 (defined as the weighted sum of the contact force vectors on the two bogie wheels) further back from the center of gravity 322, thereby decreasing the likelihood of the vehicle tumbling backwards.

Figure 4:
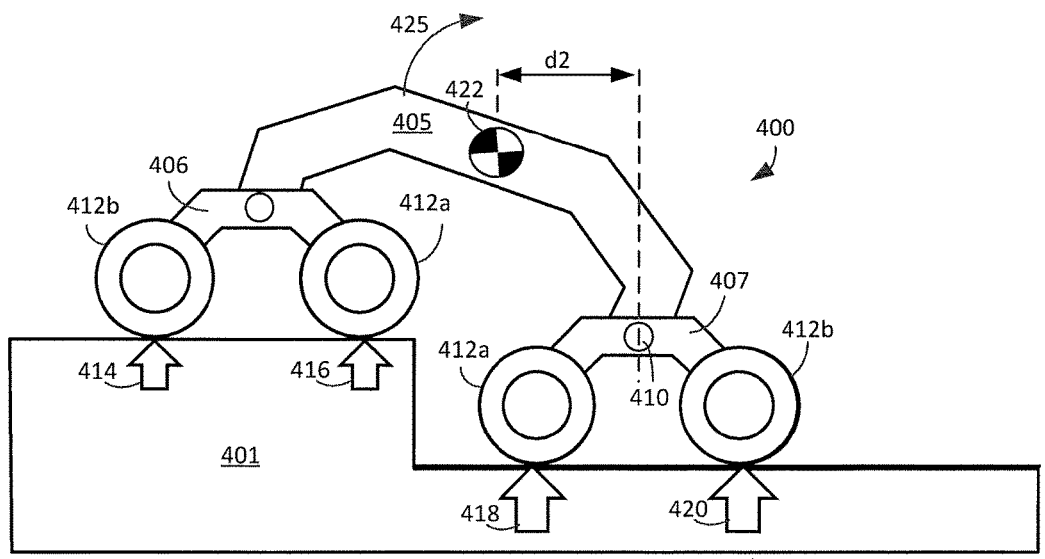
FIG. 4 is a drawing showing a ground vehicle similar to that shown in FIG. 1, but without a resilient member extending between first and second bogies.

For purposes of comparison, there is shown in FIG. 4 a ground vehicle 400 which is similar to the ground vehicle 100 but does not include a resilient member 122. Ground vehicle 400 includes a main link 405, and first and second bogies 406, 407, in an arrangement similar to that which has been described herein with respect to ground vehicle 100. The first and second bogies each have inner and outer wheels 412a, 412b. Consequently, when disposed on a step 401, the forces 418, 420 exerted on the wheels 412a, 412b of second bogie 407 are approximately equal. Similarly, forces 414, 416 exerted on the wheels 412a, 412b of bogie 406 are approximately equal.

Figure 3:
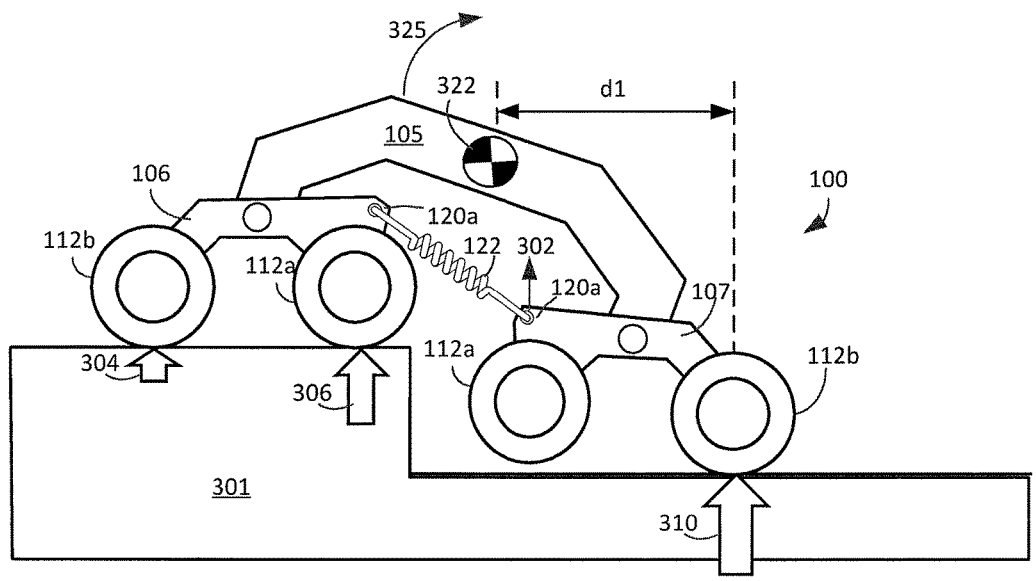
FIG. 3 is a drawing that shows the ground vehicle of FIG. 1 disposed on a stepped surface.

When climbing steep grades such as step 301, a ground vehicle 100 is at risk for tumbling end over end in a direction indicated by arrow 325. In FIG. 3, with the presence of resilient member 122 urging wheel 112a of bogie 107 in direction 302, such rotation 325 would naturally require a center of mass 322 to pivot about outer wheel 112b of second bogie 107. Compare this scenario to FIG. 4, where a rotation of the vehicle 400 in a direction indicated by arrow 425, would naturally require a center of mass 422 to pivot or rotate about a pivot mechanism 410. Note that distance d1 in FIG. 3 is greater than distance d2 in FIG. 1. This greater distance means that the ground vehicle 100 is more resistant to rotation or tumbling in direction 325 as compared to ground vehicle 400 tumbling in direction 425. In practical terms, this means that a ground vehicle 100, which includes resilient member 122, will have an enhanced ability to climb steep grades. Accordingly, the provision of resilient member 122 between first and second bogies as shown, improves one aspect of suspension performance.

Figure 5:
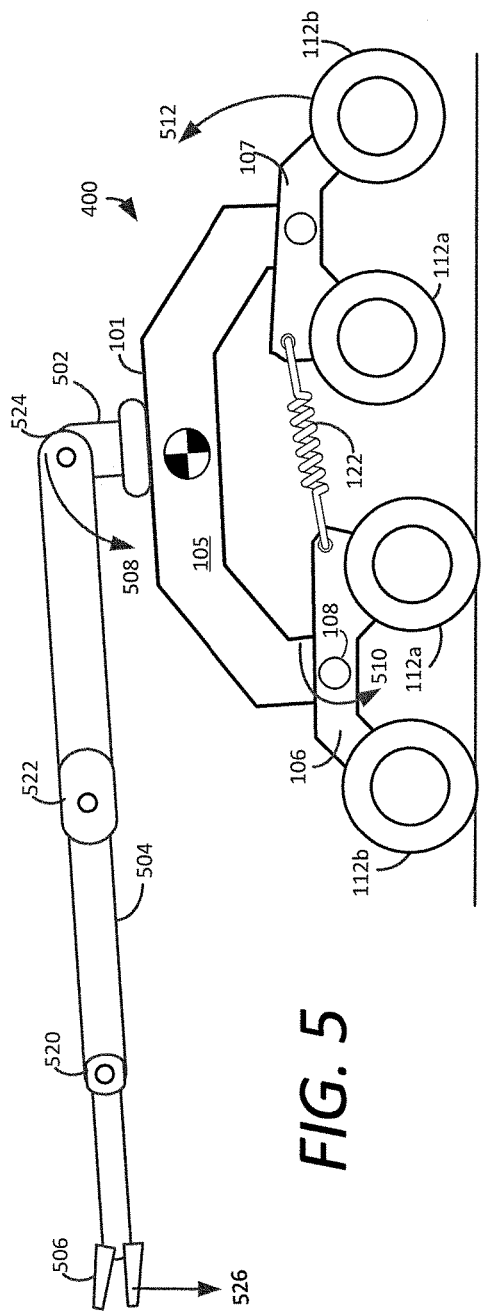
FIG. 5 is a drawing of the ground vehicle in FIG. 1 with a manipulator arm disposed on the chassis, which is useful for understanding how the height of the manipulator arm above a ground surface can be caused to decrease when the manipulator arm is used to lift heavy weights.
Figure 6:
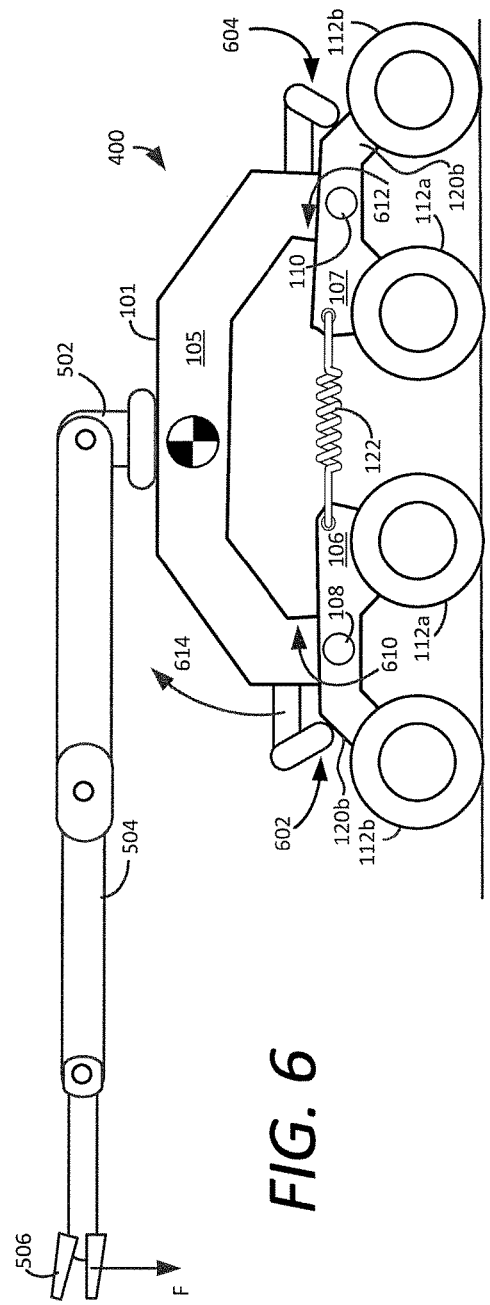
FIG. 6 is a drawing that is useful for understanding how the performance of the ground vehicle in FIG. 5 is improved by the addition of a first and second travel limiter.

Referring now to FIG. 5, there is shown a ground vehicle 400 which is similar to a ground vehicle 100, but also includes a robotic manipulator arm 504 mounted to the vehicle on a base 502. The base 502 can be securely mounted to the chassis 101. Robotic manipulator arms used on ground vehicles are well known in the art and therefore will not be described here in detail. However, it will be appreciated that a manipulator arm 504 can include actuators (not shown), several movable joints 520, 522, 524 and a grasping device 506 disposed at a distal end thereof. Use of manipulator arm 504 in an elongated or extended position as shown in FIG. 5 will exert a torque 508 on the ground vehicle 400 as shown. When a weight or force 526 is applied to the distal end of the manipulator arm, the torque 508 can be substantial so as to urge the vehicle 400 to rotate or pivot in a direction 510, 512 about pivot mechanism 108. In order to prevent such rotation or pivoting action caused by forces applied to the manipulator arm 504, a first travel limiter structure 602 is fixed to the chassis 101 or to the main link 105 as shown. The first travel limiter has a geometry and a position which are chosen to limit a relative pivot motion or rotation of the first bogie 106 in a rotation or pivot direction 610. More particularly, the position and geometry of the first travel limiter are chosen so that relative rotation of the first bogie in direction 610 is inhibited when the first bogie 106 is in a rest position as shown in FIG. 6. In the exemplary arrangement shown, the first travel limiter 602 engages a portion of the outer bogie end portion 120b on first bogie 106. However, the invention is not limited in this regard and any other suitable travel limiter structure or mechanism can be used for this purpose.

When manipulator arm 504 is extended in a direction opposite to that shown in FIGS. 5 and 6, it will exert a torque on the ground vehicle 400 in a direction opposite to 508. When a weight or force is applied to the distal end of the manipulator arm, the torque can be substantial so as to urge the vehicle 400 to rotate or pivot in a direction 614. This would cause second bogie 107 to pivot relative to the main link 105 in a direction 612. Accordingly, a second travel limiter 604 has a geometry and a position which are chosen to limit a pivot motion or rotation of the second bogie 107 (relative to main link 105) in a rotation or pivot direction 612. As shown in FIG. 6, the pivot direction 612 is opposite to the direction 610. The position and geometry of the second travel limiter 604 are chosen so that relative rotation or pivoting of the second bogie in direction 612 is inhibited when the second bogie 107 is in a second bogie rest position as shown in FIG. 6. In the exemplary arrangement shown, the second travel limiter 604 engages a portion of the outer bogie end portion 120*b* on second bogie 107. However, the invention is not limited in this regard and other suitable structures and/or mechanisms are also possible for the second travel limiter.

Figure 7:
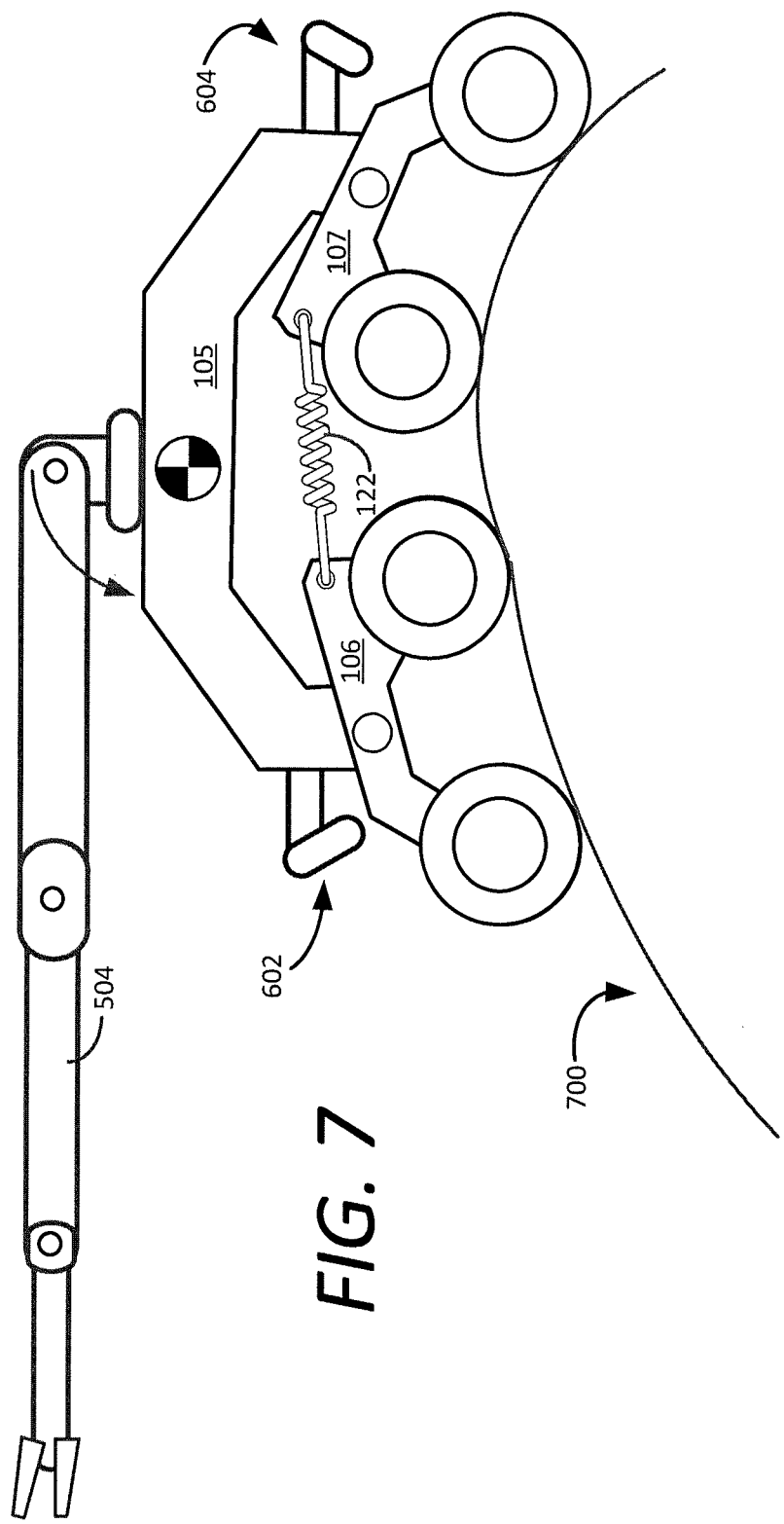
FIG. 7 is a drawing that is useful for understanding how the ground vehicle in FIG. 6 is adapted for mobility on a convex ground surface.

The first and second travel limiters 602, 604 prevent or limit rotation of the vehicle chassis when use of the manipulator arm exerts a torque on the ground vehicle 400, but allow the suspension system to conform to a stepped or convex ground surface. A stepped scenario is shown in FIG. 3. A scenario in which suspension system of ground vehicle 400 conforms to a convex terrain surface 700 is shown in FIG. 7.

Figure 8:
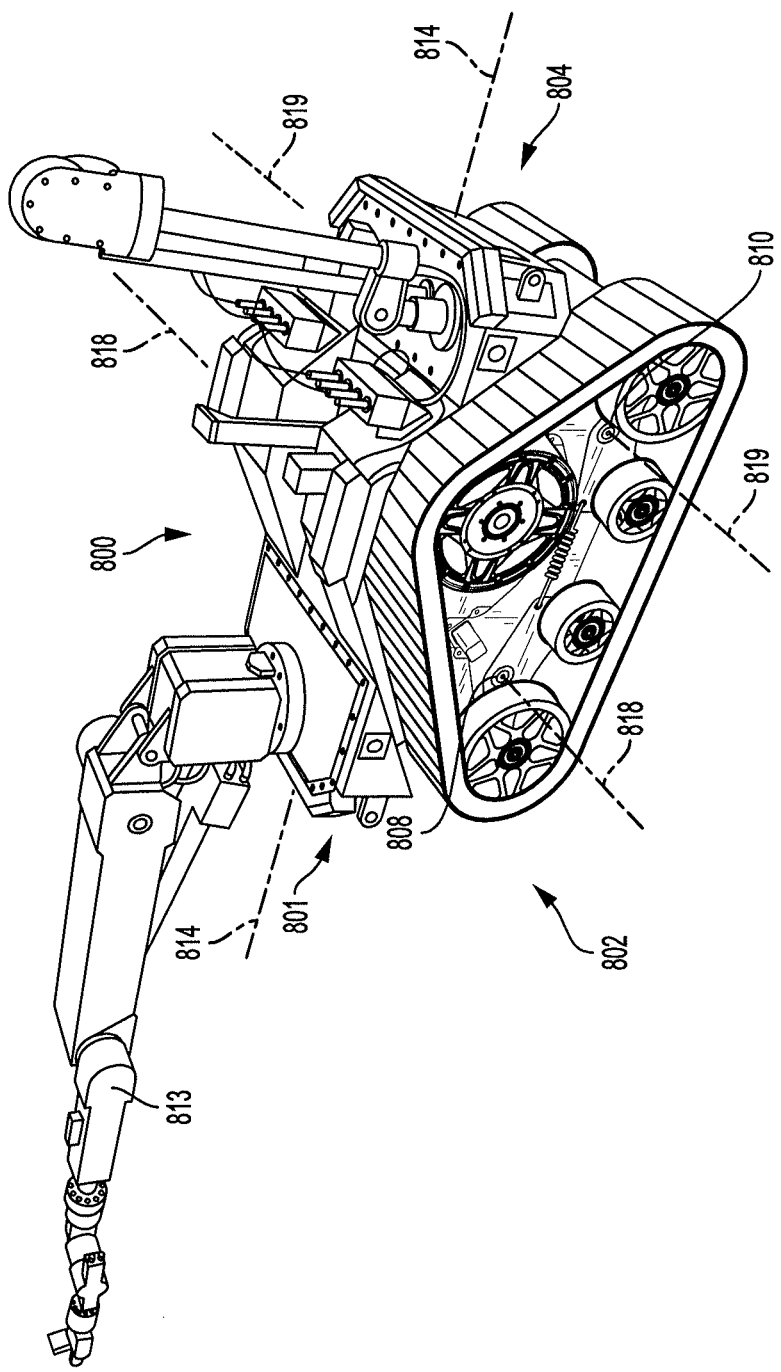
FIG. 8 is a perspective view of a tracked ground vehicle which incorporates a suspension system similar to that which is shown in FIGS. 6 and 7.

In FIGS. 1-7, certain concepts for a ground vehicle suspension system have been described. However, further improvements in mobility of such a ground vehicle can be obtained by adding continuous tracks (sometimes referred to as tank tread or caterpillar track) to the basic suspension system. Referring now to FIG. 8 there is shown an exemplary embodiment of a ground vehicle that includes a suspension system similar to that which has been described herein with respect to FIGS. 1-7. The ground vehicle further includes continuous tracks that extend over the wheels of the suspension system and further improvements as hereinafter described.

Figure 9:
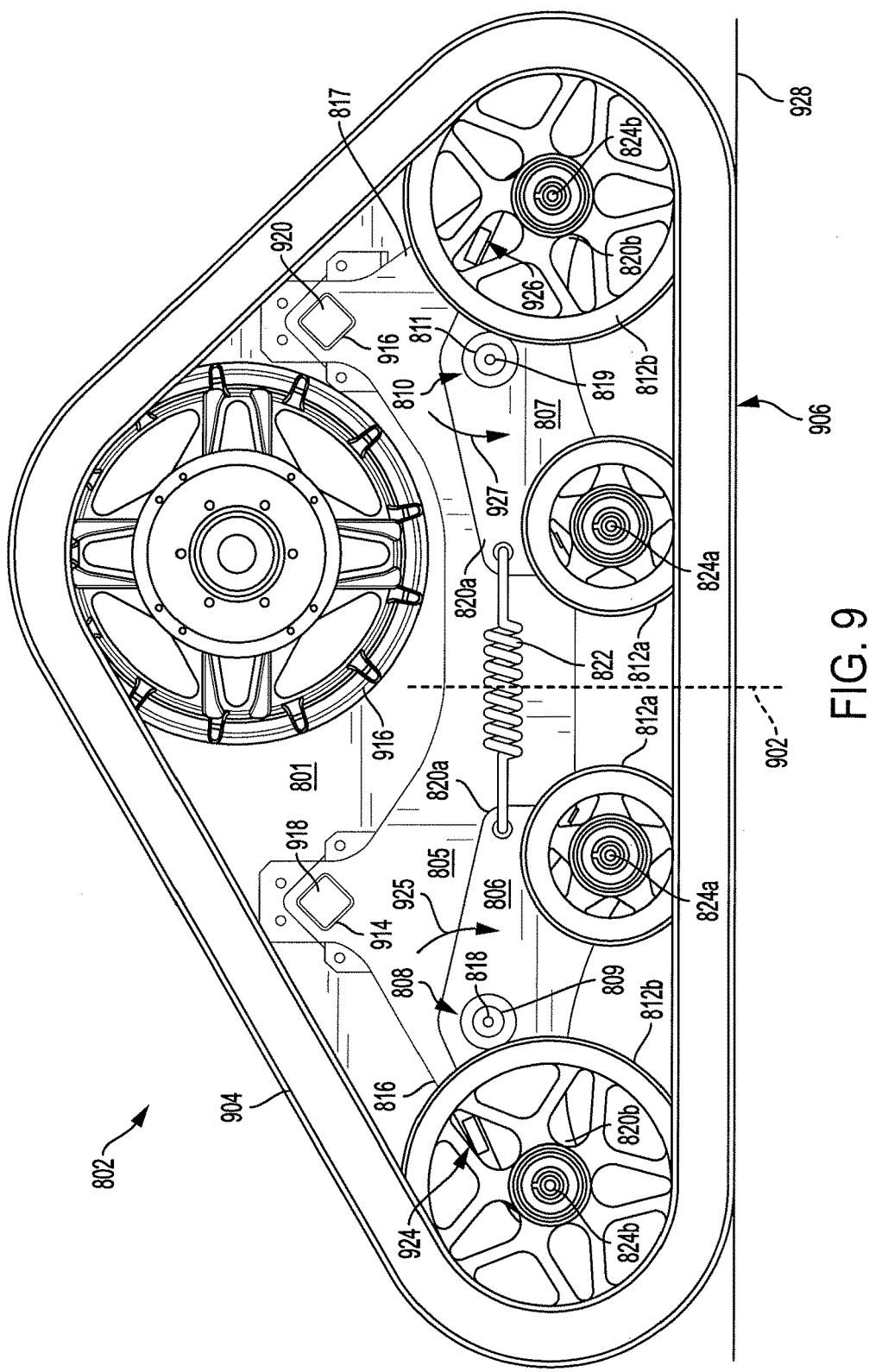
FIG. 9 is an enlarged side view showing details of a rocker-bogie suspension system used in the ground vehicle in FIG. 8.

Referring now to FIG. 8, there is shown a ground vehicle 800 that is useful for understanding certain aspects of the inventive arrangements. The ground vehicle 800 includes a chassis 801 to which are mounted certain components associated with a suspension system. The suspension system includes first and second rocker-bogie mechanisms 802, 804 that are similar to rocker bogie mechanisms 102, 104. Rocker-bogie mechanisms 802, 804 are respectively secured to the chassis 801 on opposing sides of a central axis 814. A more detailed view of rocker-bogie mechanism 802 is shown in FIG. 9. Rocker-bogie mechanism 804 is similar to rocker-bogie mechanism 802 and therefore a discussion of rocker-bogie mechanism 802 is sufficient for understanding the inventive arrangements.

As shown in FIG. 9, each rocker-bogie mechanism can include a main link 805 formed of a rigid material. The main link 805 is securely mounted to the chassis 801 on studs 918, 920. In the exemplary embodiment the main link 805 is formed as a plate member but the invention is not limited in this regard. The studs 918, 920 are secured to the chassis and can project outwardly from its sides in a direction transverse to the central axis 814. In the exemplary embodiment shown, the studs are received in mating apertures 914, 916 which are formed in the main link 805. Suitable mounting hardware (not shown) can be used to secure the main links 805 on each stud. Other methods of securing the main link to the chassis are also possible and in some embodiments the main link can be an integral part of the chassis.

The main link 805 extends a first distance along the chassis length to define opposing first and second link end portions 816, 817. A first bogie 806 and a second bogie 807 are respectively mounted to main link 805 on first and second pivot mechanisms 808, 810. The first and second pivot mechanisms allow the first and second bogie respectively to pivot about a first and a second pivot axis 818, 819. As shown in FIG. 8, each of the pivot axes 818, 819 is generally transverse to the central axis 814. More particularly, the pivot axes preferably extend in directions orthogonal to the central axis 814. The first and second pivot mechanisms 808, 810 can be any suitable arrangement to facilitate pivoting motion of first and second bogie about pivot axes 818, 819. For example, the pivot mechanism can be comprised of a conventional axle and bearing arrangement. In such embodiment, pivot axles 809, 811 can be disposed on the main link 805 on each of the first link end portion 816 and the second link end portion 817 as shown. The pivot axles can be respectively aligned with the pivot axes 818, 819 to allow each of the first bogie 806 and the second bogie 807 to pivot about a pivot axis. Each bogie 806, 807 can further include a bearing (not shown) which is secured to the bogie and journaled on one of the pivot axles 809, 811 so as to facilitate such pivot motion of the bogie about the axle.

In the embodiment show in FIGS. 8 and 9, the first and second bogies 806, 807 have a similar size, shape and configuration so that they are generally symmetric. Accordingly, the first and second bogies 806, 807 each extend a distance parallel to the central axis 814 as shown so that each defines opposing inner and outer bogie end portion 820*a*, 820*b*. Other arrangements are also possible and in some embodiments the first and second bogie can have a different size, shape and/or configuration so that they are not symmetric. As shown in FIG. 9, the inner bogie end portion 820*a* of the first bogie 806 is adjacent the inner bogie end portion 820*a* of the second bogie 807. A distance between the inner bogie end portions is bridged by a resilient member 822. On each of the first and second bogies an inner and outer stub-axle 824*a*, 824*b* is respectively located at the inner and outer bogie end portion. The inner stub-axle 824*a* rotatably supports an inner wheel 812*a*. An outer wheel 812*b* is supported on the outer stub axle 824*b*. The outer wheels 812*b* preferably have a larger diameter as compared to the inner wheels 812*a* to facilitate mobility of the vehicle over obstacles. The inner wheels 812*a* are preferably of relatively smaller diameter to facilitate maximum rotational travel of the first and second bogies without adverse interaction with other portions of the suspension mechanism.

In order to limit rotation or pivoting action of the chassis 801 caused by forces applied to the manipulator arm 804, a first travel limiter structure 924 is fixed to the main link 805 as shown. The first travel limiter 924 has a configuration and a position which are chosen to limit a relative pivot motion or rotation of the first bogie 806 in a rotation or pivot direction 925. More particularly, the position and geometry of the first travel limiter are chosen so that relative rotation of the first bogie in direction 925 is inhibited when the first bogie 806 is in a rest position as shown in FIG. 9. The rest position is a condition where the vehicle 800 is disposed on a level ground surface 928. In the exemplary arrangement shown, the first travel limiter 924 engages a portion of the outer bogie end portion 820*b* on first bogie 806. However, the invention is not limited in this regard and any other suitable travel limiter structure or mechanism can be used for this purpose. A second travel limiter 926 has a configuration and a position which are chosen to limit a relative pivot motion or rotation of the second bogie 807 in a rotation or pivot direction 927, opposite pivot directions 925. More particularly, the position and geometry of the second travel limiter are chosen so that relative rotation of the second bogie in direction 927 is inhibited when the second bogie 807 is in the rest position as shown in FIG. 9. In the exemplary arrangement shown, the second travel limiter 926 engages a portion of the outer bogie end portion 820b on second bogie 807. However, the invention is not limited in this regard and any other suitable travel limiter structure or mechanism can be used for this purpose.

In an exemplary embodiment of the invention, a motor, such as an electric motor (not shown) is used to rotate a drive wheel 916. Further a continuous track 904 extends snugly around an outer periphery of wheels 812a, 812b of first bogie 806, wheels 812a, 812b of second bogie 807, and the drive wheel 916. The continuous track (which is sometimes called a caterpillar track) is a continuous band or web that is driven around an outer periphery of the suspension mechanism defined by the wheels. In some embodiments, the continuous track can include a channel or other type of guide structure that interacts with each wheel as an aid in guiding the continuous track around an outer periphery of the wheels as shown. The continuous track will have aggressive treads to provide good traction over a wide variety of surfaces. The continuous track can be made of rubber or polymer material reinforced with metal wires. The relatively large surface of the track (as compared to the wheels 812a, 812b) distributes the weight of the vehicle over a larger surface area. For purposes of the present disclosure the interior side of the continuous track can be understood to be the side engaged by the wheels 820a, 820b of bogies 806, 807. The exterior side is the opposing of the continuous track on which terrain engaging treads are disposed. A terrain engaging surface 906 is disposed on an exterior side of the continuous track 904. The terrain engaging surface forms a generally planar surface when the ground vehicle is on a level surface with the first and second bogies 806, 807 in their rest positions as shown. The terrain engaging surface therefore extends in a generally linear path along a distance between the outer wheel 812b on the first bogie 806 and the outer wheel 812b on the second bogie.

Figure 10:
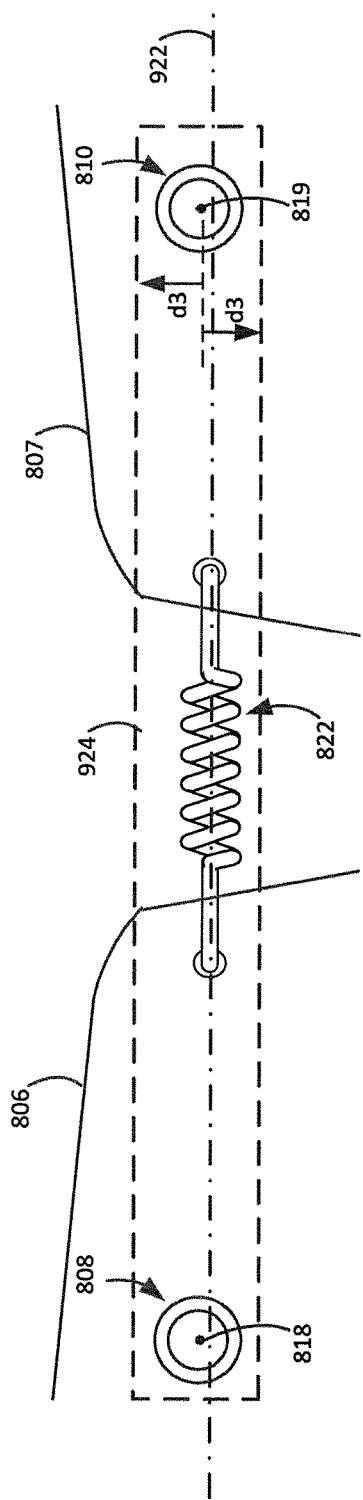
FIG. 10 is a schematic drawing which is useful for understanding an alignment zone of a resilient member relative to pivot axes of the bogies.

The resilient member 822 extends between the first and second bogie and is attached at one end to the inner bogie end portion 820a of the first bogie 806 and at an opposing end to the inner bogie end portion 820a of the second bogie 807. According to one aspect of the invention, the resilient member 822 can be a coil spring made of a spring metal. However, the invention is not limited in this regard and other types of resilient members can also be used for purposes of the inventive arrangements described herein. For example, a resilient member formed as described herein can also be formed of an elastic polymer material. A force axis along which the resilient member 822 exerts a spring force is generally in-line with the two pivot axes 818, 819 when the bogies 806, 807 are in their rest positions as shown in FIGS. 8 and 9. This concept is shown in more detail in FIG. 10 which shows force axis 922 generally aligned with the pivot mechanisms 808, 810. In some embodiments, the force axis 922 is exactly aligned along the pivot axes 818, 819. However, exact alignment is not required for purposes of the inventive arrangements and it can be sufficient for the force axis to be aligned within an alignment zone 924 which extends a short distance d3 in opposing directions transverse to each pivot axis. The exact size of the alignment zone 925 can be chosen by a designer but d3 should be limited so that rotation of one of the bogies away from the neutral position shown in FIG. 10 generally results in stretching the resilient member in such a way that the resulting spring force acts to rotate the other bogie in the opposite direction; resulting in a more symmetric configuration of the bogies.

Figure 11:
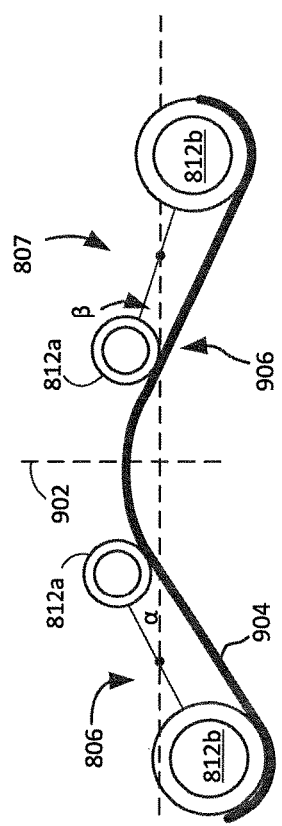
FIG. 11 is a schematic representation of the first and second bogies of the ground vehicle in FIGS. 8 and 9, which is useful for understanding the behavior of the suspension system.

The spring constant or stiffness of the resilient member 822 is advantageously selected so that the resilient member will cause the first and second bogie to rotate in a manner which is symmetric about a centerline 902. This symmetrical rotation allows the terrain engaging surface 906 on an exterior side of the continuous track 904 to conform to a concave shape as shown in FIG. 11. Such symmetrical rotation as urged by the resilient member 922 is not limited to scenarios where the one of the bogies 806, 807 rotates through an exactly equivalent angular extent in response to rotation by the other bogie 806, 807. Accordingly, in the schematic representation of bogie position shown in FIG. 11, a magnitude of angular rotation α of a first bogie 806 may be different as compared to the magnitude of angular rotation β of the second bogie 807. Thus, the term symmetrical rotation as used herein refers to a condition where a rotation of one bogie in a first rotation direction results in a similar magnitude of rotation of the other bogie in an opposite rotation direction. An actual angular difference in magnitude of rotation as between the bogies will depend partly on force exerted upon the bogies as a result of the particular terrain conditions. Still, it should be understood that the angular difference can be significant (e.g. as much as 30 degrees) while still generally being considered as symmetric rotation. The exact stiffness can be chosen by a designer, but the spring stiffness should not be too low, or the benefits of the spring will be minimal. Nor should the spring stiffness be too high, as this would overly inhibit rotation of the bogies.

From the foregoing discussion it will be understood that the travel limiters 924, 926 serve an important function when a manipulator arm 813 is used to lift heavy objects. Specifically, they prevent undesirable rotation of the main links around the pivot axes 818, 819 caused when the manipulator arm 813 exerts a torque force on the chassis 801. But when a ground vehicle 800 is traversing certain types of natural or man-made surfaces, it may be advantageous to allow the first and second bogies 806, 807 to pivot respectively in rotation directions 925, 927 beyond the limits which are set by the travel limiters 925, 926. An example of such terrain may include ground surfaces which include areas that are generally concave in shape. Accordingly, it can be advantageous to provide travel limiters 924, 926 which have a variable configuration.

An exemplary arrangement schematically illustrating this concept is shown in FIGS. 12A and 12B. In a first state shown in FIG. 12A, a travel limiter 1224 can be configured to inhibit rotation of the first bogie 806 in direction 1225 from a rest position where the bogie is aligned with line 1202. In a second configuration shown in FIG. 12B, the travel limiter 1224 can be re-positioned, reconfigured or adjusted to allow the first bogie 806 to have a greater degree of rotation in direction 1225. In this example, the adjustment of the travel limiter is effected by using the geometry of the travel limiter structure and a simple rotation of the travel limiter as shown. However, the invention is not limited in this regard and other adjustment methods are also possible. Further, it should be understood that the re-positioning or reconfiguration of the travel limiter can be performed by the user manually or by a control system and a suitable actuator. For example, in the embodiment shown in FIGS. 12A and 12B, an actuator (e.g. which can be an electric motor) could be used to re-configure the position travel limiter 1224 as shown. An adjustable travel limiter as described herein can be used for the first bogie, the second bogie or both.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A ground vehicle, comprising:
a chassis having a central axis which extends along a chassis length;
a suspension system including first and second rocker-bogie mechanisms which are respectively secured to the chassis on opposing sides of the central axis, each rocker-bogie mechanism comprising:
a main link formed of a rigid material that is fixed to the chassis and extends a first distance along the chassis length to define opposing first and second link end portions;
a first and a second pivot mechanism respectively disposed at the first and second link end portions of the main link;
a first bogie and a second bogie which are respectively mounted to the main link on the first and second pivot mechanisms to respectively pivot about a first and a second pivot axis which are each transverse to the center axis, the first and second bogie each extending a second distance parallel to the central axis so that each defines opposing inner and outer bogie end portions, with the inner bogie end portion of the first bogie adjacent to the inner bogie end portion of the second bogie;
on each of the first and second bogie, an inner and outer stub-axle is respectively located at the inner and outer bogie end portion, an inner wheel is disposed on the inner stub axle and an outer wheel is disposed on the outer stub axle;
a continuous track which is guided on the inner and outer wheels of both the first bogie and the second bogie; and
a resilient member which extends between the first and second bogie along a resilient member axis which is transverse to the first and second pivot axis, and is attached at one end to the inner bogie end portion of the first bogie and at an opposing end to the inner bogie end portion of the second bogie;
wherein the resilient member axis is substantially aligned with the first and second pivot axis when a portion of the continuous track extends linearly between the outer wheels of the first and second bogies.

2. The ground vehicle according to claim 1, wherein the resilient member has a predetermined stiffness characteristic which causes the resilient member to urge said second bogie to a rotational orientation that is symmetric to a rotational orientation of the first bogie when the first bogie is pivoted about the first pivot axis.

3. The ground vehicle according to claim 1, further comprising a drive motor for urging the continuous track along the inner and outer wheels of both the first bogie and the second bogie in a continuous loop.

4. A ground vehicle, comprising:
a chassis having a central axis which extends along a chassis length; and
a suspension system including first and second rocker-bogie mechanisms which are respectively secured to the chassis on opposing sides of the central axis, each rocker-bogie mechanism comprising:
a main link formed of a rigid material that is fixed to the chassis and extends a first distance along the chassis length to define opposing first and second link end portions;
a first and a second pivot mechanism respectively disposed at the first and second link end portions of the main link;
a first bogie and a second bogie which are respectively mounted to the main link on the first and second pivot mechanisms to respectively pivot about a first and a second pivot axis which are each transverse to the center axis, the first and second bogie each extending a second distance parallel to the central axis so that each defines opposing inner and outer bogie end portions, with the inner bogie end portion of the first bogie adjacent to the inner bogie end portion of the second bogie;
on each of the first and second bogie, an inner and outer stub-axle is respectively located at the inner and outer bogie end portion, an inner wheel is disposed on the inner stub axle and an outer wheel is disposed on the outer stub axle;
a continuous track which is guided on the inner and outer wheels of both the first bogie and the second bogie; and
a resilient member which extends between the first and second bogie and is attached at one end to the inner bogie end portion of the first bogie and at an opposing end to the inner bogie end portion of the second bogie;
wherein the resilient member extends along a resilient member axis which is transverse to the first and second pivot axis; and
wherein an exterior face of the continuous track extending between the outer wheels of the first and second bogies defines a primary terrain engagement surface and the resilient member axis is substantially aligned with the first and second pivot axis when the primary terrain engagement surface extends linearly between the outer wheels.

5. A ground vehicle, comprising:
a chassis having a central axis which extends along a chassis length;
a suspension system including first and second rocker-bogie mechanisms which are respectively secured to the chassis on opposing sides of the central axis, each rocker-bogie mechanism comprising:
a main link formed of a rigid material that is fixed to the chassis and extends a first distance along the chassis length to define opposing first and second link end portions;
a first and a second pivot mechanism respectively disposed at the first and second link end portions of the main link;
a first bogie and a second bogie which are respectively mounted to the main link on the first and second pivot mechanisms to respectively pivot about a first and a second pivot axis which are each transverse to the center axis, the first and second bogie each extending a second distance parallel to the central axis so that each defines opposing inner and outer bogie end portions, with the inner bogie end portion of the first bogie adjacent to the inner bogie end portion of the second bogie;

on each of the first and second bogie, an inner and outer stub-axle is respectively located at the inner and outer bogie end portion, an inner wheel is disposed on the inner stub axle and an outer wheel is disposed on the outer stub axle;

a continuous track which is guided on the inner and outer wheels of both the first bogie and the second bogie; and a resilient member which extends between the first and second bogie and is attached at one end to the inner bogie end portion of the first bogie and at an opposing end to the inner bogie end portion of the second bogie;

a manipulator arm coupled to the chassis; and at least one travel limiter structure coupled to the chassis or main link at a position selected to inhibit a pivot motion of the first or second bogie about the first or second pivot axis when use of the manipulator arm exerts a torque on the ground vehicle;

wherein an exterior face of the continuous track extending between the outer wheels of the first and second bogies defines a primary terrain engagement surface, the first and second pivot mechanisms are respectively aligned with a force axis of the resilient member to facilitate a pivot motion of the first bogie in a first rotation direction from a first bogie rest position and a symmetric pivot motion of the second bogie in a second rotation direction from a second bogie rest position, the second rotation direction opposite to the first rotation direction, the first and second rotation directions facilitate a concave deformation of the exterior face when a deformation force is exerted upon the exterior face in the direction toward the main link.

6. A ground vehicle, comprising:

a chassis having a central axis which extends along a chassis length; and a suspension system including first and second rocker-bogie mechanisms which are respectively secured to the chassis on opposing sides of the central axis, each rocker-bogie mechanism comprising:

a main link formed of a rigid material that is fixed to the chassis and extends a first distance along the chassis length to define opposing first and second link end portions;

a first and a second pivot mechanism respectively disposed at the first and second link end portions of the main link;

a first bogie and a second bogie which are respectively mounted to the main link on the first and second pivot mechanisms to respectively pivot about a first and a second pivot axis which are each transverse to the center axis, the first and second bogie each extending a second distance parallel to the central axis so that each defines opposing inner and outer bogie end portions, with the inner bogie end portion of the first bogie adjacent to the inner bogie end portion of the second bogie;

on each of the first and second bogie, an inner and outer stub-axle is respectively located at the inner and outer bogie end portion, an inner wheel is disposed on the inner stub axle and an outer wheel is disposed on the outer stub axle;

a continuous track which is guided on the inner and outer wheels of both the first bogie and the second bogie; and a resilient member which extends between the first and second bogie and is attached at one end to the inner bogie end portion of the first bogie and at an opposing end to the inner bogie end portion of the second bogie;

a robotic manipulator arm mounted on said chassis;

at least a first travel limiter structure fixed to the chassis or to the main link, positioned to limit a pivot motion of the first bogie in a second rotation direction from a first bogie rest position;

wherein an exterior face of the continuous track extending between the outer wheels of the first and second bogies defines a primary terrain engagement surface, the first and second pivot mechanisms are respectively aligned with a force axis of the resilient member to facilitate a pivot motion of the first bogie in a first rotation direction from the first bogie rest position and a symmetric pivot motion of the second bogie in the second rotation direction from a second bogie rest position, the second rotation direction opposite but to the first rotation direction, wherein the first and second rotation directions facilitate a concave deformation of the exterior face when a deformation force is exerted upon the exterior face in the direction toward the main link; and wherein the first travel limiter structure inhibits a rotation of the main link about the first pivot axis when a first torque is exerted on the chassis by the robotic manipulator arm.

7. The ground vehicle according to claim 6, further comprising:

a second travel limiter fixed to the chassis or to the main link which limits a pivot motion of the second bogie in the first rotation direction from the second bogie rest position;

wherein the second travel limiter structure inhibits rotation of the main link about the second pivot axis when a second rotational torque is exerted on the chassis by the robotic manipulator arm.

8. The ground vehicle according to claim 6, wherein the first travel limiter structure prevents a distal end portion of the robotic manipulator arm from drooping during times when the robotic manipulator arm is extended horizontally or is lifting heavy objects.

9. A ground vehicle, comprising:

a chassis having a central axis which extends along a chassis length; and a suspension system including first and second rocker-bogie mechanisms which are respectively secured to the chassis on opposing sides of the central axis, each rocker-bogie mechanism comprising:

a main link formed of a rigid material that is fixed to the chassis and extends a first distance along the chassis length to define opposing first and second link end portions;

a first and a second pivot mechanism respectively disposed at the first and second link end portions of the main link;

a first bogie and a second bogie which are respectively mounted to the main link on the first and second pivot mechanisms to respectively pivot about a first and a second pivot axis which are each transverse to the center axis, the first and second bogie each extending a second distance parallel to the central axis so that each defines opposing inner and outer bogie end portions, with the inner bogie end portion of the first bogie adjacent to the inner bogie end portion of the second bogie;

on each of the first and second bogie, an inner and outer stub-axle is respectively located at the inner and outer bogie end portion, an inner wheel is disposed on the inner stub axle and an outer wheel is disposed on the outer stub axle;

a continuous track which is guided on the inner and outer wheels of both the first bogie and the second bogie; and a resilient member which extends between the first and second bogie and is attached at one end to the inner bogie end portion of the first bogie and at an opposing end to the inner bogie end portion of the second bogie;

wherein the outer wheel is larger in diameter as compared to the inner wheel.

10. A ground vehicle, comprising:

a chassis having a central axis which extends along a chassis length;

a suspension system including first and second rocker-bogie mechanisms which are respectively secured to the chassis on opposing sides of the central axis, each rocker-bogie mechanism comprising:

a main link formed of a rigid material that is fixed to the chassis and extends a first distance along the chassis length to define opposing first and second link end portions;

first and second bogies respectively pivotally mounted to the main link at opposing ends thereof so as to respectively pivot about a first and a second pivot axis, the first and second bogie each having opposing inner and outer bogie end portions;

an inner and outer stub-axle respectively located at each of the inner and outer bogie end portions, with an inner wheel disposed on the inner stub axle and an outer wheel disposed on the outer stub axle;

a continuous track which is guided on the inner and outer wheels of both the first bogie and second bogie; and a resilient member which extends between the first and second bogie along a resilient member axis which is transverse to the first and second pivot axis, and is attached at one end to the inner bogie end portion of the first bogie and at an opposing end to the inner bogie end portion of the second bogie;

wherein the resilient member is substantially aligned with the first and second pivot axis when a portion of the continuous track extends linearly between the outer wheels of the first and second bogies.

11. The ground vehicle according to claim 10, wherein the resilient member has a predetermined stiffness characteristic which urges said second bogie to a rotational orientation that is symmetric to a rotational orientation of the first bogie when the first bogie is pivoted about the first pivot axis.

12. The ground vehicle according to claim 10, wherein an exterior face of the continuous track extends between the outer wheels of the first and second bogies to define a primary terrain engagement surface, the first bogie is arranged to pivot in a first rotation direction from a first bogie rest position and the second bogie is arranged to pivot in a second rotation direction from a second bogie rest position, the second rotation direction opposite to the first rotation direction, and the first and second rotation directions facilitate a concave deformation of the exterior face when a deformation force is exerted upon the exterior face in the direction toward the main link.

13. A ground vehicle, comprising:

a chassis having a central axis which extends along a chassis length; and a suspension system including first and second rocker-bogie mechanisms which are respectively secured to the chassis on opposing sides of the central axis, each rocker-bogie mechanism comprising:

a main link formed of a rigid material that is fixed to the chassis and extends a first distance along the chassis length to define opposing first and second link end portions;

first and second bogies respectively pivotally mounted to the main link at opposing ends thereof so as to respectively pivot about a first and a second pivot axis, the first and second bogie each having opposing inner and outer bogie end portions;

an inner and outer stub-axle respectively located at each of the inner and outer bogie end portions, with an inner wheel disposed on the inner stub axle and an outer wheel disposed on the outer stub axle;

a continuous track which is guided on the inner and outer wheels of both the first bogie and second bogie; and a resilient member which extends between the first and second bogie and is attached at one end to the inner bogie end portion of the first bogie and at an opposing end to the inner bogie end portion of the second bogie;

wherein the resilient member extends along a resilient member axis which is transverse to the first and second pivot axis; and wherein the continuous track to defines a primary terrain engagement surface which extends from the outer wheel of the first bogies to the outer wheel of the second bogie, and the resilient member axis is substantially aligned with the first and second pivot axis when the primary terrain engagement surface extends linearly between the outer wheel of the first bogie and second bogie.

14. A ground vehicle, comprising:

a chassis having a central axis which extends along a chassis length;

a suspension system including first and second rocker-bogie mechanisms which are respectively secured to the chassis on opposing sides of the central axis, each rocker-bogie mechanism comprising:

a main link formed of a rigid material that is fixed to the chassis and extends a first distance along the chassis length to define opposing first and second link end portions;

first and second bogies respectively pivotally mounted to the main link at opposing ends thereof so as to respectively pivot about a first and a second pivot axis, the first and second bogie each having opposing inner and outer bogie end portions;

an inner and outer stub-axle respectively located at each of the inner and outer bogie end portions, with an inner wheel disposed on the inner stub axle and an outer wheel disposed on the outer stub axle;

a continuous track which is guided on the inner and outer wheels of both the first bogie and second bogie; and a resilient member which extends between the first and second bogie and is attached at one end to the inner bogie end portion of the first bogie and at an opposing end to the inner bogie end portion of the second bogie;

a robotic manipulator arm mounted on said chassis; and at least a first travel limiter structure fixed to the chassis or to the main link, positioned to limit a pivot motion of the first bogie in a second rotation direction from a first bogie rest position;

wherein an exterior face of the continuous track extends between the outer wheels of the first and second bogies to define a primary terrain engagement surface, the first bogie is arranged to pivot in a first rotation direction from the first bogie rest position and the second bogie is arranged to pivot in the second rotation direction from a second bogie rest position, the second rotation direction opposite to the first rotation direction, and the first and second rotation directions facilitate a concave deformation of the exterior face when a deformation force is exerted upon the exterior face in the direction toward the main link; and wherein the first travel limiter structure inhibits rotation of the main link around the first pivot axis when a first torque is exerted on the chassis by the robotic manipulator arm; and wherein the resilient member axis (a) extends along a resilient member axis which is transverse to the first and second pivot axis, and (b) is substantially aligned with the first and second pivot axis pivot axis when a portion of the continuous track extends linearly between the outer wheels of the first and second bogies.

15. The ground vehicle according to claim 14, further comprising:

a second travel limiter fixed to the chassis or to the main link which limits a pivot motion of the second bogie in the first rotation direction from the second bogie rest position;

wherein the second travel limiter inhibits rotation of the main link around the second pivot axis when a second torque is exerted on the chassis by the robotic manipulator arm in a direction opposite that of the first torque.

16. The ground vehicle according to claim 14, wherein the first travel limiter structure is selectively adjustable to variably control a permitted amount of rotation of the main link around the pivot axis.

17. A ground vehicle, comprising:

a chassis having a central axis which extends along a chassis length; and a suspension system including first and second rocker-bogie mechanisms which are respectively secured to the chassis on opposing sides of the central axis, each rocker-bogie mechanism comprising:

a main link formed of a rigid material that is fixed to the chassis and extends a first distance along the chassis length to define opposing first and second link end portions;

first and second bogies respectively pivotally mounted to the main link at opposing ends thereof so as to respectively pivot about a first and a second pivot axis, the first and second bogie each having opposing inner and outer bogie end portions;

an inner and outer stub-axle respectively located at each of the inner and outer bogie end portions, with an inner wheel disposed on the inner stub axle and an outer wheel disposed on the outer stub axle;

a continuous track which is guided on the inner and outer wheels of both the first bogie and second bogie; and a resilient member which extends between the first and second bogie and is attached at one end to the inner bogie end portion of the first bogie and at an opposing end to the inner bogie end portion of the second bogie;

wherein the outer wheel is larger in diameter as compared to the inner wheel.

* * * * *